Feb. 7, 1950 — F. A. BELLATO — 2,496,516
MACHINE FOR SIZING AND CLEANSING ASPARAGUS TIPS
Filed Nov. 19, 1945 — 3 Sheets-Sheet 1

INVENTOR.
FRANK A. BELLATO.
BY
Thomas Castberg
ATTORNEY.

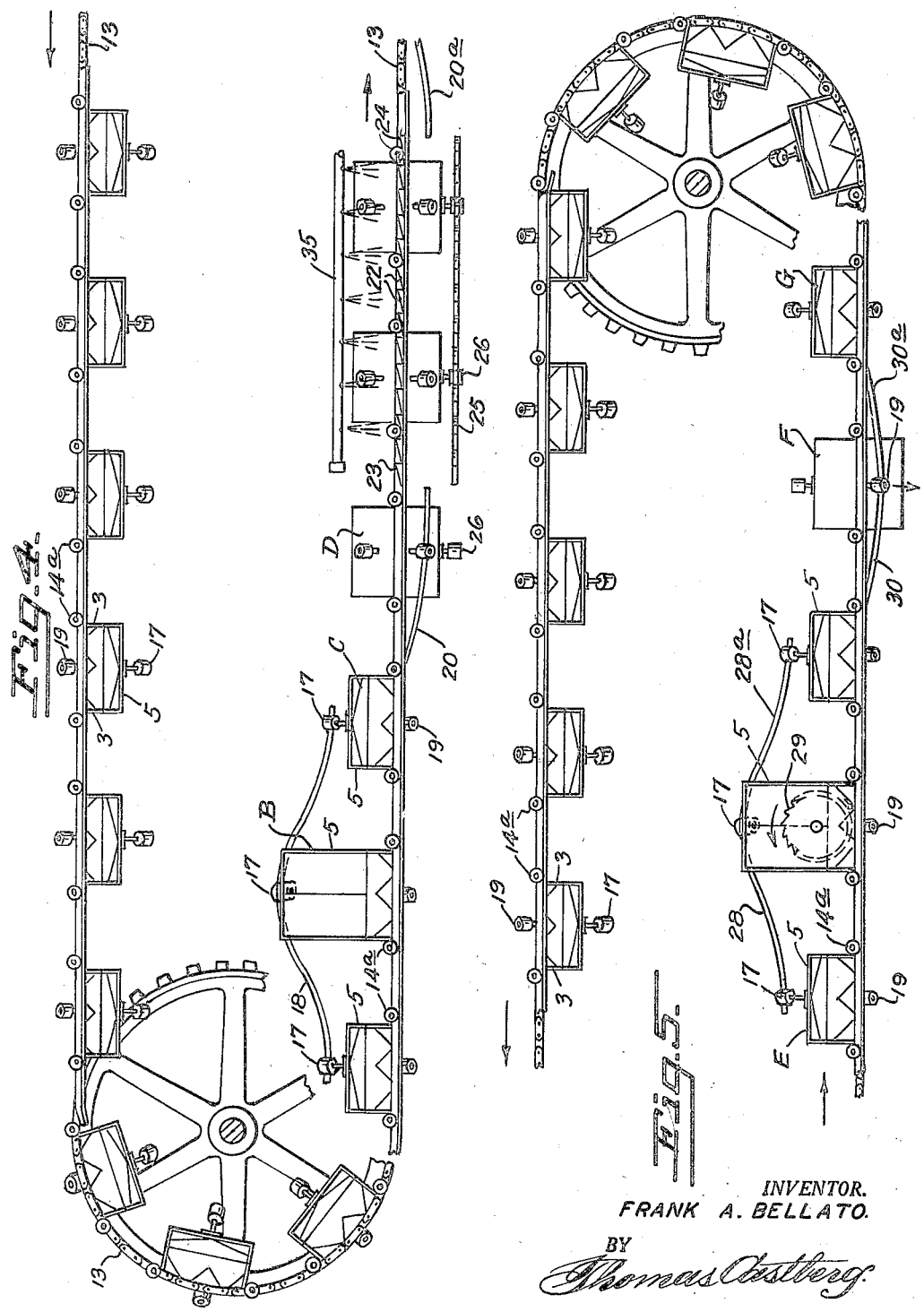

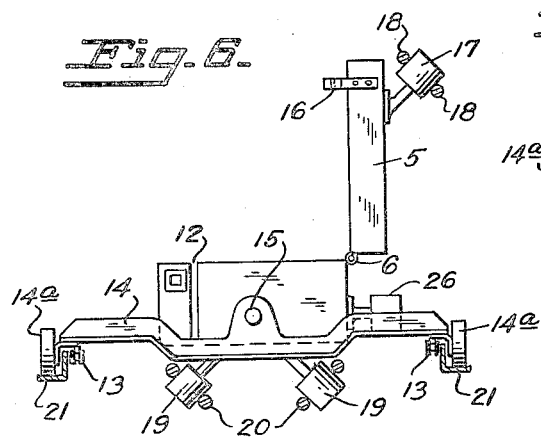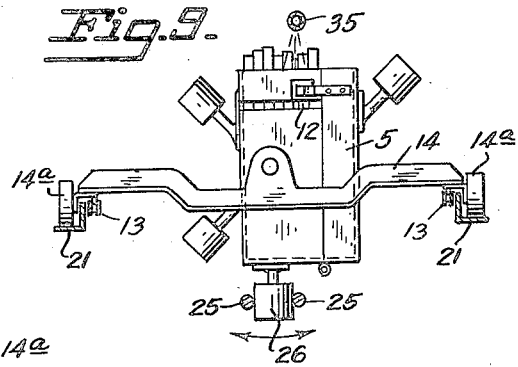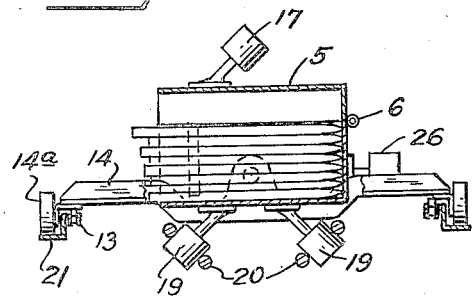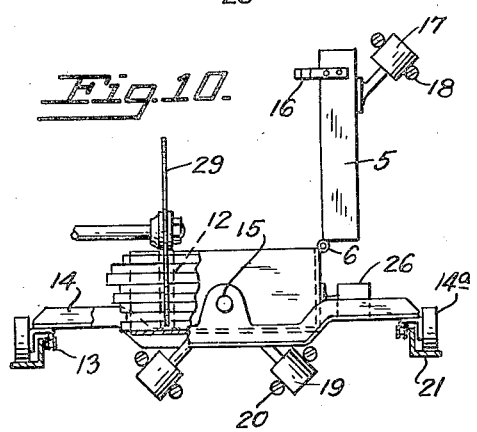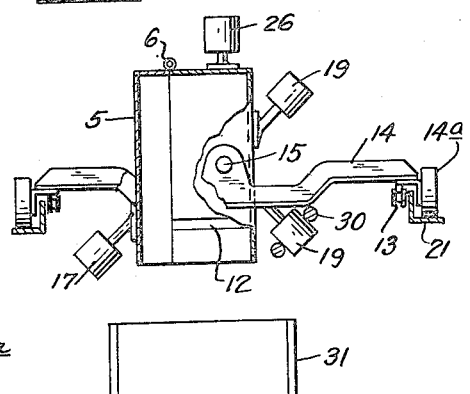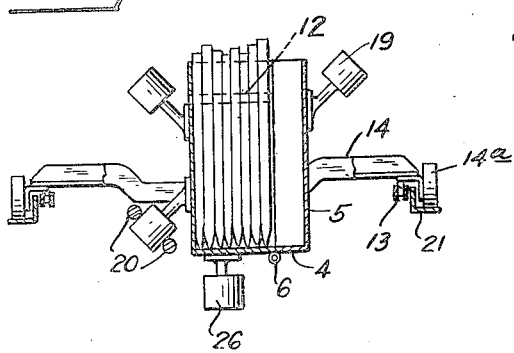

Patented Feb. 7, 1950

2,496,516

UNITED STATES PATENT OFFICE 2,496,516

MACHINE FOR SIZING AND CLEANSING ASPARAGUS TIPS

Frank A. Bellato, Stockton, Calif., assignor to Bartolomeo Del Carlo, Stockton, Calif.

Application November 19, 1945, Serial No. 629,444

1 Claim. (Cl. 146—82)

This invention relates to a machine for positioning and sizing asparagus.

Asparagus, when cut and harvested in the fields, are of varying length, and in this condition are brought into the packing plants where they are washed and cut to a specified length, then packed in crates to be shipped to the market, or they are delivered directly to canneries for cooking and canning. The tip portion of the asparagus is the tender and edible portion and varies in length from four to six inches or more. The remaining portion of the asparagus is usually tough or stringy.

The method used in packing plants is to place the asparagus on a flat belt with the tip ends against a gage board which determines the length. They are then cut off by a saw. The length which results depends upon how well the operators place the tips in position. Inasmuch as the asparagus are handled in bunches only a few of them are cut off to the maximum allowed length. In other words when one or two of the asparagus touch the gage board, the bunch is dropped and most of the asparagus are cut shorter than their usable length. Some packers hire operators to stand at the belt and push the asparagus against the gage board. However, due to the large amount of asparagus which passes the operator, only a few are detected and positioned for cutting, and the waste is accordingly very considerable.

Another method used by some packers is to place the asparagus in shipping crates leaving the bottom of the crates open. The projecting ends are then cut, using the bottom edge as a guide. A large knife to hand-cut a crate full of asparagus is employed. The bottom is then nailed on. This method also has great waste as the packer is paid by the amount of crates he or she packs, and is interested in filling the crates rather than placing the asparagus carefully in the crate. The contents of the crate is finally sold by the pound and the cost rises due to the small tonnage sold per acre packed. The fact that all packers use the same methods keeps the market competitive and the waste is passed on to the consumer by an increase in price.

The object of the present invention is to eliminate waste or throwing away that edible portion of asparagus which is cut off when the asparagus is cut too short, and furthermore to obtain asparagus of a substantially uniform length; to provide a machine which is simple in construction and operation, said machine receiving the asparagus in bunches and the machine causing the tip ends of the asparagus in each bunch to settle against a gage plate and to remain in that position until cut off by a saw; and further, to provide a machine which is capable of continuous operation, large output, and to which asparagus is delivered in bunches at one end of a continuously moving conveyor, and as they travel towards the discharge end of the machine, the tip ends of the asparagus are automatically brought into engagement with the gage plate, then automatically cut to uniform length, and finally discharged.

One form of machine that may be employed is shown by way of illustration in the accompanying drawings in which:

Figure 4 is a diagrammatic side elevation of the front or feeding end of the machine;

Figure 5 is a diagrammatic view forming a continuation of Figure 4 and showing the rear or discharge end of the machine;

Figure 6 is a cross section of a conveyor showing a container with its cover open and in position to receive a bunch of asparagus;

Figure 7 is a similar section showing the asparagus placed within the container and the cover in closed position;

Figure 8 is a similar section showing the container swung to vertical position;

Figure 9 is a similar cross section showing water being applied to wash the asparagus;

Figure 10 is a similar section showing the container swung back to horizontal position with the cover open, and also showing the position of the saw with relation to the container; and Figure 11 is a similar section showing the container in vertical discharging position.

Figure 1:
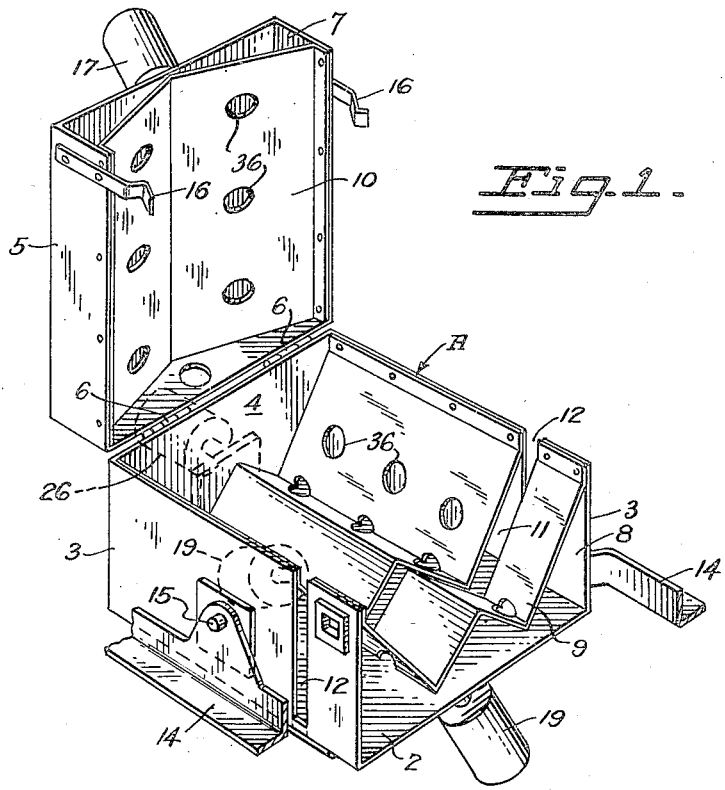
Figure 1 is a perspective view of a container provided for the reception of a bunch of asparagus.

Referring to the drawings in detail, and particularly Fig. 1, A indicates in general a container which is provided for the purpose of receiving, holding and positioning a bunch of asparagus tips so that they may be passed through a saw and cut to uniform length. The container comprises a bottom portion 2, a pair of side sections 3—3 and an end section 4 which will hereinafter be referred to as the gage plate, and a cover section 5 which is secured to the end section 4 by means of hinges 6. One end of the cover is open as indicated at 7, and so is the adjacent end 8 of the container. A false bottom section 9 is secured within the container and spaced therefrom, and a false cover 10 is secured within the cover 5. The false cover section 10 is more or less V-shaped in cross section, while the false bottom section 9 may be said to have the shape of a W and in addition thereto it has a cross slot 11 formed therein and aligning slots 12 are formed in the sides of the container to provide a passage for a circular saw, as will hereinafter be described.

In actual practice a considerable number of containers of the type shown in Fig. 1 are employed and they are supported and spaced apart on an endless conveyor such as diagrammatically shown in Figs. 4 and 5. The conveyor illustrated in the present instance comprises a pair of sprocket chains 13—13 spaced apart horizontally. These chains carry pairs of cross arms 14—14 and each pair of arms serves as a pivotal support for the container A. The pivots connecting the container and cross arms are shown at 15 (see Figs. 1, 2 and 3).

Continuous travel is imparted to the conveyor chains in any suitable manner and during this travel each container will reach the loading position B where the cover is automatically opened to assume the position shown in Figs. 1 and 6, or that indicated at B in Fig. 4. The cover in each container is normally held in closed position by a pair of flexible latches 16—16 but as each container approaches the loading position B, a roller 17 carried by the cover engages a cam track 18 and is thereby raised to open position. An operator at this point places a bunch of asparagus in the container with the tip ends pointing towards the gage plate 4 (see Fig. 7). No attempt is made by the operator to position the asparagus as this is accomplished by machine operation. After the container has been loaded, that is while it is travelling, the cam track closes the cover and the cover is fully closed and secured by the latches 16—16 when the position C is reached (see Fig. 4). At this point a pair of rollers 19—19 secured to the bottom section of the container engage a cam track 20, and this swings the container about the pivots 15—15 from a horizontal position to a vertical position with the open end of the container up and the gage plate 4 lowermost. This position is shown at D in Fig. 4, and it is also shown in Figs. 3 and 8.

Figure 2:
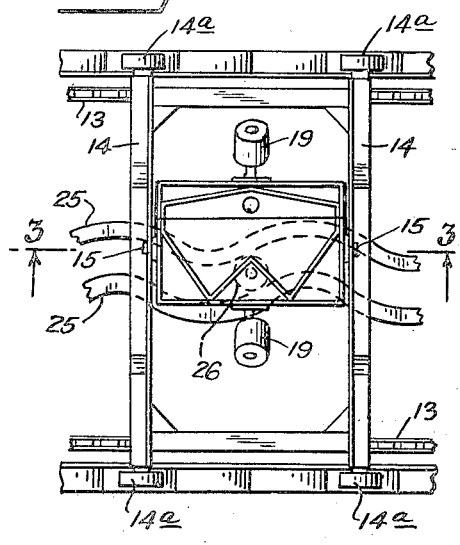
Figure 2 is a plan view of a portion of a conveyor showing the container carried thereby and positioned vertically.
Figure 3:
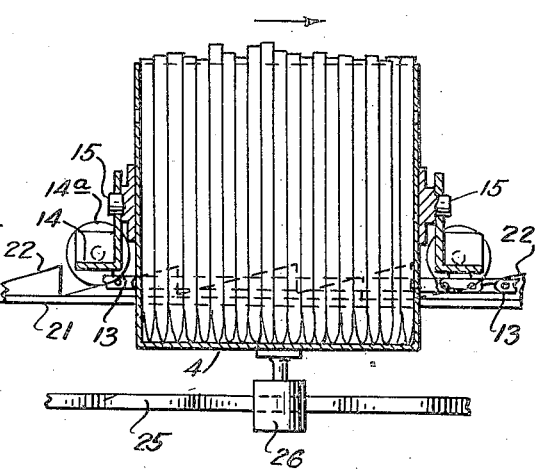
Figure 3 is a vertical cross section taken on line 3—3 of Figure 2.

By referring to Figs. 2, 4 and 9, it will be noted that the cross arms 14—14 between which the container is pivotally mounted are provided with rollers 14a at opposite ends and that they engage a pair of tracks 21—21 on the surface of which are formed step-like members 22 (see particularly Fig. 3). These tracks extend from a point 23 (see Fig. 4) to a point 24, and extending the same distance and disposed centrally between the tracks 21—21 is a pair of wave-shaped tracks 25—25 (see particularly Figs. 2 and 4), said tracks engaging a roller 26 secured to the gage plate 4 of the container. Thus as the container in its vertical position leaves the cam track 20 and engages the tracks 21—21 and 25—25 a horizontal rocking or lateral movement will be imparted to the container by the tracks 25—25 about the pivots 15, and a vertical jolting movement is simultaneously imparted by the step-like members 22, and as the asparagus previously placed in the container is at this time in a generally vertical position pointing downwardly toward the gage plate 4 (see Figs. 3 and 8), it is obvious that the vertical jolting and lateral rocking movement imparted to the container will cause the asparagus to settle downwardly until all of the tip ends engage the gage plate, as clearly shown in Fig. 3.

By the time the container reaches the point 24 (see Fig. 4) the asparagus will be settled and substantially all of the tip ends will contact the gage plate 4. The container then continues to advance and if reference is now made to Fig. 5 which is a continuation of Fig. 4, it will be noted that one of the rollers 19 engages track 20a which swings the container back to a horizontal position as indicated at E in Fig. 5. After return to horizontal position, the roller 17 on the cover engages the cam track 28 and the cover is opened, and while in the open position the container passes by a circular saw 29 (see Figs. 5 and 10). This saw passes through the slots 11 and 12 of the container and thereby cuts off the butt or waste ends of the asparagus. After this is accomplished, the cam track portion shown at 28a closes the cover. The rollers 19 again engage a cam track indicated at 30 and the container is now swung about its pivots to a vertical position, that is with the open end pointing downwardly as shown in Fig. 11. The asparagus is thus discharged into a box such as shown at 31 or on to a conveyor, not shown. This dumping position is shown at F in Fig. 5. The track portion shown at 30a now returns the container to a horizontal position as shown at G, and it remains in this position while returning to the loading point B where the cover is opened by the cam track 18 and the cycle of operation is thus completed.

The machine not only serves the purpose of receiving, holding, positioning and cutting off the butt ends of asparagus, but it may also serve the purpose of washing the asparagus. This may be accomplished in any suitable manner, but as here shown a spray pipe 35 is arranged above the tracks 21 and 25 between the points 23 and 24. The spray emitted by this pipe is directed downwardly through the open ends of the containers while they are being jolted vertically and rocked laterally and the water is drained off through perforations 36 in the false cover and bottom sections as shown in Fig. 1. The final result due to the operation of the machine including the washing operation is clean asparagus of uniform length and the substantial elimination of waste.

Having thus described my invention, what I claim and desire to secure by Letters Patent is:

In a machine of the character described, an endless conveyor, a container pivotally supported on the conveyor, a cover member hingedly secured to the container, means normally retaining the cover in closed position, means actuated during movement of the container for positioning it horizontally, means for momentarily opening the cover to permit a bunch of asparagus to be placed in the container with the tip ends pointing in one direction, means for closing the cover after insertion of the asparagus, a gage plate in the container adjacent the tip ends, means for changing the position of the container from a horizontal to a vertical position with the tip ends of the asparagus lowermost, means for simultaneously imparting a vertical and lateral jolting movement to the container to cause the asparagus to settle until the tip ends contact the gage plate, means for directing a spray of water downwardly through the asparagus to wash the same while they are subjected to the vertical and lateral jolting movement, means for returning the container to a horizontal position, means for cutting off the projecting butt ends of the asparagus, means for discharging the sized asparagus, and means for maintaining the conveyor in continuous movement while the foregoing operations are taking place.

FRANK A. BELLATO.

REFERENCES CITED

The following references are of record in the file of this patent:

UNITED STATES PATENTS

| Number | Name | Date |
|---|---|---|
| 1,091,787 | Adams | Mar. 31, 1914 |
| 1,454,555 | Nielsen | May 8, 1923 |
| 1,866,027 | Gill | July 5, 1932 |
| 1,992,688 | Bonvallet | Feb. 26, 1935 |
| 2,310,358 | Emmons et al. | Feb. 9, 1943 |